(12) United States Patent
Faggionato

(10) Patent No.: US 8,849,765 B2
(45) Date of Patent: Sep. 30, 2014

(54) SYSTEM AND METHOD FOR PROVIDING A PERMANENT DATA RECORD FOR A CREATIVE WORK

(76) Inventor: Anne Marina Faggionato, Monaco (CH)

( * ) Notice: Subject to any disclaimer, the term of this patent is extended or adjusted under 35 U.S.C. 154(b) by 161 days.

(21) Appl. No.: 12/107,646

(22) Filed: Apr. 22, 2008

(65) Prior Publication Data

US 2009/0265371 A1 Oct. 22, 2009

(51) Int. Cl.
*G06F 17/00* (2006.01)
*G06F 7/00* (2006.01)
*G06F 17/30* (2006.01)

(52) U.S. Cl.
CPC .............................. *G06F 17/30876* (2013.01)
USPC ................ 707/648; 715/743; 705/52; 705/54

(58) Field of Classification Search
CPC ..................... G06Q 10/087; Y10S 707/99939; G06F 21/64
USPC ................... 707/999.102, 636, 648; 715/743; 705/52, 54
See application file for complete search history.

(56) References Cited

U.S. PATENT DOCUMENTS

| | | | |
|---|---|---|---|
| 4,104,721 A * | 8/1978 | Markstein et al. ............ | 711/164 |
| 4,168,586 A | 9/1979 | Samis | |
| 5,048,085 A * | 9/1991 | Abraham et al. ............. | 713/159 |
| 5,177,360 A | 1/1993 | Fernandez-Rubio | |
| 5,521,815 A | 5/1996 | Rose, Jr. | |
| 5,521,984 A | 5/1996 | Denenberg et al. | |
| 5,673,338 A | 9/1997 | Denenberg et al. | |
| 5,910,987 A * | 6/1999 | Ginter et al. ..................... | 705/52 |
| 5,915,019 A * | 6/1999 | Ginter et al. ..................... | 705/54 |
| 5,917,912 A * | 6/1999 | Ginter et al. .................. | 713/187 |
| 5,920,861 A * | 7/1999 | Hall et al. ............. | 707/999.004 |
| 5,991,876 A * | 11/1999 | Johnson et al. ................. | 726/28 |
| 6,014,674 A * | 1/2000 | McCargar .............. | 707/999.004 |
| 6,034,931 A | 3/2000 | Miwa et al. | |
| 6,240,185 B1 * | 5/2001 | Van Wie et al. ............... | 380/232 |
| 6,351,439 B1 | 2/2002 | Miwa et al. | |
| 6,470,449 B1 * | 10/2002 | Blandford ..................... | 713/178 |
| 6,574,609 B1 * | 6/2003 | Downs et al. ................... | 705/50 |
| 6,753,864 B2 * | 6/2004 | Vienneau et al. ............. | 345/473 |

(Continued)

FOREIGN PATENT DOCUMENTS

| | | |
|---|---|---|
| CN | 1233340 A | 10/1999 |
| JP | 2002-109143 A | 4/2002 |

(Continued)

OTHER PUBLICATIONS

Anonymous : "Using MediaWiki" [Online] Jan. 29, 2008, pp. 1-4, XP002515012.

(Continued)

*Primary Examiner* — Pavan Mamillapalli
(74) *Attorney, Agent, or Firm* — Day Pitney LLP

(57) ABSTRACT

System and method for providing a permanent data record for a creative work. In one embodiment, a process is provided to include receiving a request for a permanent data record to be issued for the creative work. The request can indicate a type of data record to be issued. Data corresponding to the creative work may also be received. The process can include generating the permanent data record using the received data, such that the received data is unalterable. Further, the permanent data record can be associated with the creative work.

5 Claims, 6 Drawing Sheets

(56) References Cited

U.S. PATENT DOCUMENTS

| | | | |
|---|---|---|---|
| 6,847,299 B2* | 1/2005 | Franks | 340/572.1 |
| 6,885,286 B2* | 4/2005 | Franks | 340/5.8 |
| 7,042,335 B2* | 5/2006 | Franks | 340/5.8 |
| 7,046,828 B1 | 5/2006 | Gibbs et al. | |
| 7,337,172 B2* | 2/2008 | Shapiro | 707/999.01 |
| 7,375,614 B2* | 5/2008 | Franks | 340/5.8 |
| 7,436,978 B2* | 10/2008 | Wadhwa et al. | 382/100 |
| 7,734,590 B2* | 6/2010 | Chand et al. | 707/636 |
| 8,087,063 B2* | 12/2011 | Martin et al. | 726/2 |
| 2002/0081039 A1* | 6/2002 | Funahashi | 382/305 |
| 2003/0097313 A1* | 5/2003 | Saul et al. | 705/27 |
| 2005/0033735 A1* | 2/2005 | Shapiro | 707/3 |
| 2005/0216360 A1 | 9/2005 | Osterer | |
| 2006/0069988 A1* | 3/2006 | Bailey | 715/521 |
| 2006/0071070 A1 | 4/2006 | Maier | |
| 2006/0136307 A1* | 6/2006 | Hays et al. | 705/26 |
| 2006/0149681 A1* | 7/2006 | Meisner | 705/52 |
| 2006/0155645 A1* | 7/2006 | Sainsbury-Carter et al. | 705/44 |
| 2006/0232414 A1* | 10/2006 | Franks | 340/572.1 |

FOREIGN PATENT DOCUMENTS

| | | | |
|---|---|---|---|
| JP | 2002-203136 A | 7/2002 |
| JP | 2003-112825 A | 4/2003 |
| JP | 2003-316871 A | 11/2003 |
| JP | 2005-063255 A | 5/2005 |
| JP | 2007-526583 A | 9/2007 |
| JP | 2008-090831 A | 4/2008 |

OTHER PUBLICATIONS

International Search Report mailed Feb. 25, 2009.

Office Action issued by the Mexican Institute of Industrial Property, dated Apr. 13, 2012, in connection with corresponding Mexican Patent Application No. MX/a/2010/011592 (Three (3) pages).

English translation of the Office Action issued by the Mexican Institute of Industrial Property, dated Apr. 13, 2012, in connection with corresponding Mexican Patent Application No. MX/a/2010/011592 (Three (3) pages).

Office Action issued by the Eurasian Patent Office, dated May 31, 2012, in connection with corresponding Eurasian Patent Application No. 201071219 (Three (3) pages).

English translation of the Office Action issued by the Eurasian Patent Office, dated May 31, 2012, in connection with corresponding Eurasian Patent Application No. 201071219 (One (1) page).

Office Action issued by the State Intellectual Property Office of the People's Republic of China, dated Sep. 18, 2012, in connection with corresponding Chinese Patent Application No. 200880128792.3 (Six (6) pages).

English translation of the Office Action issued by the State Intellectual Property Office of the People's Republic of China, dated Sep. 18, 2012, in connection with corresponding Chinese Patent Application No. 200880128792.3 (Five (5) pages).

International Preliminary Report on Patentability and Written Opinion for related PCT application No. PCT/IB2008/001863, issued Oct. 26, 2010.

IP Australia, Patent Examination Report No. 1 for related Australian patent application No. 2008-355312, issued Oct. 18, 2013.

English language translation of Decision of Final Rejection for related Japanese application No. P2011-505603, Jan. 30, 2014.

English language translation of Non-Final Office Action for related Japanese application No. P2011-505603, Dec. 7, 2012.

Substantive Re-Examination Report for related ARIPO patent application No. AP/P/2010/005468 (addendum to Form 21), Feb. 11, 2014.

Partial English Translation of Preliminary Examination Results in related KR application No. 10-2010-7024703, dated Apr. 29, 2014.

\* cited by examiner

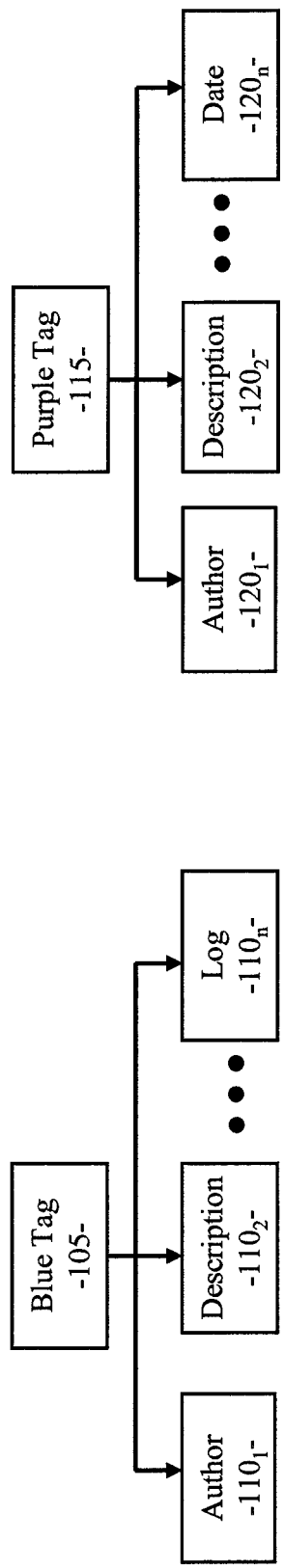
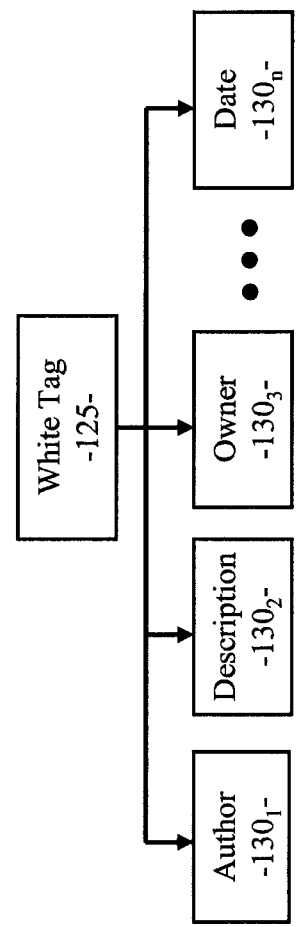
Fig. 1A
Fig. 1B
Fig. 1C

SYSTEM AND METHOD FOR PROVIDING A PERMANENT DATA RECORD FOR A CREATIVE WORK

FIELD OF THE INVENTION

The present invention relates in general to a method and apparatus for providing a record for a creative work and more particularly to providing a permanent record defined by one or more authors to include information describing a creative work.

BACKGROUND

As the number of works of art increase and the ontology of these works evolve, challenges and increasing challenges are created in the cataloguing of such works. Conventional methods and devices provide labeling and cataloguing works of art. One conventional method includes manual cataloguing of works of art such as a printed publication or catalogue raisonné. Typically, individuals other than the artists themselves are responsible for provide information to describe the works of art for such catalogues. As such, conventional methods are susceptible to false or incomplete information and/or false credit may be provided for such works of art. Further, information associated with a particular work of art may not be aligned with the views of the artists for such works. Manual cataloguing is limited in its ability to provide information about a work of art. The ability to determine information related to the authors responsible for the entries is limited. Manually collecting information from each artist to describe works of art may be unpractical and inconsistent.

Another conventional method includes labeling actual works of art with identification markers. However, these methods are limited in the amount of data which may be attached to or associated with each work of art. Further, such methods do not provide a standard or secure process for accessing such data or for providing the data in a common or structured form. Additionally, these conventional methods assume that data associated with a particular work of art has and will be preserved. However, these assumptions may no longer be valid. Data provided by these conventional methods may be susceptible to error, loss, damage, corruption and fraud.

While conventional methods providing cataloguing of works of art, such methods struggle to meet the requirements for providing a secure, permanent, authoritative record of the work. Moreover, the information can be considered unreliable given the inconsistency of current collection methods.

BRIEF SUMMARY OF THE INVENTION

Disclosed and claimed herein are a system and method for providing a permanent data record for a creative work. In one embodiment, a method is provided including receiving a request for a permanent data record to be issued for a creative work. The request can indicate a type of data record to be issued. The method may also include receiving data corresponding to the creative work. A permanent data record can be generated using the received data, such that the received data is unalterable. The method can further include associating the permanent data record with the creative work.

Other aspects, features, and techniques of the invention will be apparent to one skilled in the relevant art in view of the following detailed description of the invention.

BRIEF DESCRIPTION OF THE DRAWINGS

FIGS. 1A-1C depict structures of data records according to one or more embodiments of the invention;

DETAILED DESCRIPTION OF EXEMPLARY EMBODIMENTS

Figure 2B:
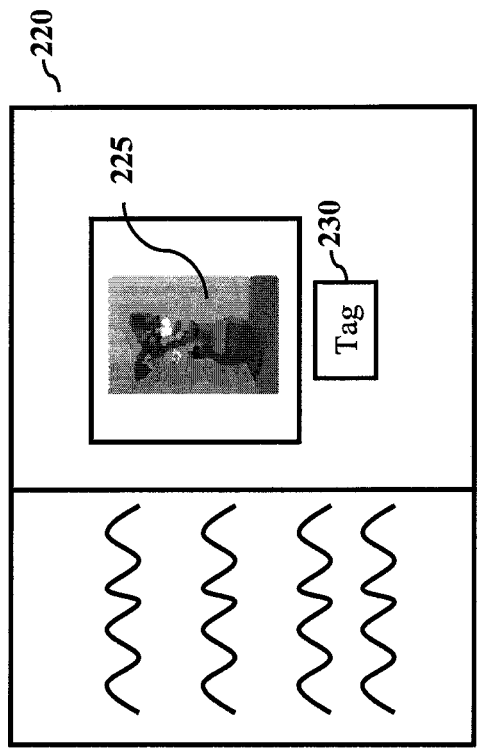
FIGS. 2A-2C depict graphical representations of applications of data records for a work of art according to one or more embodiments of the invention.

One aspect of the present invention is directed to providing a data record for a creative work. In one embodiment, a permanent record may be issued by an author credited with creating the creative work. As used herein, a creative work may refer to at least one of fine art, such as a song, music, phrase, book, film, print, sculpture, painting, two-dimensional object, three-dimensional object art work in general, installation, temporary creation and artistic creation. It may also be appreciated that a creative work may relate to media objects such as a digital image, moving digital image, web page, two-dimensional representation, three-dimensional representation and interactive media in general. As used herein, an author may relate to at least one of an artist, painter, sculptor, designer, composer, authors and author in general credited with creating a creative work. According to another embodiment, the permanent record may include information associated with the creative work. The information may be stored electronically as a data record. Further, the data record may be readable by one or more designated users to receive information associated with the creative work.

Another embodiment of the invention is to provide a system configured to issue and maintain permanent records for a plurality of creative works. The system may include a server configured to issue data records to authors. The server may further be configured to retrieve data stored with a data record related to the creative work. According to another embodiment, the system may include a database configured to store data records. The server may be used to transmit and receive data in relation to a user terminal. The system may interoperate with a data communication network to issue data records to an author operating a user terminal.

According to another embodiment, a computer program product is provided for supplying data records for creative works. The computer program product may include computer readable program code to issue data records for creative works. According to another embodiment, the computer program product may include computer readable program code to store data as a non-editable computer readable file.

Another aspect of the invention is directed to providing an open content reference database for creative works. In one embodiment, a plurality of data record types may be issued for a creative work. For example, data records may relate to data records for one or more of an author, a user defined by an author and users in general. With an open content reference database, users can provide information for creative works which may be accessible and useable to provide reference information for a creative work.

When implemented in software, the elements of the invention are essentially the code segments to perform the necessary tasks. The program or code segments can be stored in a processor readable medium. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, etc. The code segments may be downloaded via computer networks such as the Internet, Intranet, wide area networks (WANs), local area networks (LANs), general packet radio service (GPRS), third generation (3G) mobile communications, WiFi, etc.

Referring now to the drawings, FIGS. 1A-1C illustrates structures for data records which can be associated with creative works, according to one or more embodiments. As will be described in more detail below, a data record may be specified for a particular entity. For example, a data record may be established for one or more of an author, a user defined by an author and users in general. According to one embodiment, only a single data record may be created for a creative work. According to another embodiment, data records for reprints of original works, such as photographic prints, may include an indication the creative work is not original, unique, hast a cast number, is a lifetime cast, posthumous cast, etc.

Referring first to FIG. 1A, a permanent data record, blue tag 105, is shown according to one embodiment of the invention. Blue tag 105 relates to a data record which may be issued only for an author credited with creating a particular creative work. In one embodiment of the invention, an author may utilize blue tag 105 to provide a standardized description of the creative work. As shown in FIG. 1A, blue tag 105 includes a plurality of fields $110_{1-n}$, wherein each field may be specified to store a particular type of data defined by the author. Author field $110_1$ may be used to store the name or identify of the author. Description field $110_2$ may be used to store an author's description of the creative work. Data stored in description field $110_2$ may be embodied as text, image data, audio and/or moving images. According to another embodiment, data provided by the author in the description field $110_2$ may be used to describe the creative work when the work is displayed, presented in printed publications, at auction and/or presented as electronic media. For example, description field $110_2$ may reveal that the creative work relates to an oil on canvas painting, a bronze sculpture, etc. Description field $110_2$ may also include the exact title that the author has provided for the creative work and/or the date the creative work is completed.

Continuing to refer to FIG. 1A, blue tag 105 may include a log field $110_n$ which may to used to store data related to a time and/or date the blue tag was created. Further, log field $110_n$ may provide data which has been appended by the author. According to one embodiment, blue tag 105 may be locked as a permanent data record by the author, such that data stored within the tag is unalterable. As such, log field $110_n$ may be used to store revised and/or new description information provided by the author when the blue tag 105 has been locked. While blue tag 105 is illustrated as having a set number of fields $110_{1-n}$, it should be appreciated that additional fields may be included in the tag 105. Similarly, it may be appreciated that blue tag 105 may be configured to have a single field according to another embodiment.

According to another embodiment, blue tag 105 may be used to provide biographical information for an author. For example, biographical information may be stored in one or more field $110_{1-n}$ of blue tag 105. It may be appreciated that an author may provide their own autobiography using at least one blue tag 105 associated with at least one creative work.

Referring now to FIG. 1B, a data record, purple tag 115, is shown which may be issued to an entity with rights to a creative work. For example, a purple tag 115 may be issued to a user which has been defined by an author. In other embodiments, a purple tag 115 may be issued to a copyright owner. According to another embodiment, purple tag 115 may be utilized when an author is no longer living. As such, posthumous information associated with a creative work may be provided as a data record. As shown in FIG. 1B, purple tag 115 includes author field $120_1$ which may be used to identify an entity that was issued the purple tag. The entity defined in the author field 120 may be established by an author, the estate of the author or by an entity responsible for the authors work, such as a museum. Purple tag 115 may also include a description field $120_2$ to provide information as entered by the entity identified in author field $120_1$. Data field $120_n$ may be used to store information related to the date the purple tag 115 is created, as well as dates where information may have been appended to the tag 115. It may also be appreciated that purple tag 115 may include other data fields in addition to those shown in FIG. 1B.

Referring now to FIG. 1C, a data record, white tag 125, is shown which may be used a reference data record for a creative work. In one embodiment, white tag 125 may relate to an open source record. Alternatively, white tag 125 may relate to a fee based reference which may require registration. According to another embodiment, white tag 125 may be used to enter descriptive information for a particular creative work by a general user. For example, in one exemplary embodiment, white tag 125 may be generated for an online artwork encyclopedia, wherein users may provide descriptions for particular creative works. In that fashion, the data provided by white tag 125 may be accessed to reveal information related to the creative work. As shown in FIG. 1C, white tag 125 includes an author field $130_1$, which may be used to store an identity for a particular user responsible for entering data related to the creative work. Author field $130_1$ may be configured to store a plurality of user identities.

According to another embodiment, white tag 125 may relate to a data record which may be used by an expert associated with creative work. In this embodiment, author field $130_1$ may be used to identify at least one expert associated with white tag 125. As such, white tag 125 may be used as an expert generated reference for a creative work.

Continuing to Refer to FIG. 1C, description field $130_2$ may be used to store data describing the creative work which may include, text, image, audio and movable image data. White tag 125 may include owner field $130_3$ to indicate the current owner associated with the creative work including an owner name, address, telephone number, etc. Owner field $130_3$ may be useful when creative works are offered for sale and/or to authenticate creative works. According to another embodiment, white tag 125 may include date field $130_n$ which may be used to store date information related to entries for white tag 125. In that fashion, a log may be provided for entries to the open source data record.

As described above in FIGS. 1A-1C, data records may be associated with creative works. According to another embodiment of the invention, a data record may be provided which relates to a combination of the data records as described above. For example, in one embodiment, a data record may be provided which may include a blue tag 105 and a white tag 125. As such the combination tag may include fields associated with both a blue tag 105 and a white tag 125. It should also be appreciated that a combination tag may relate to other combinations of the data records as described above.

Figure 2A:
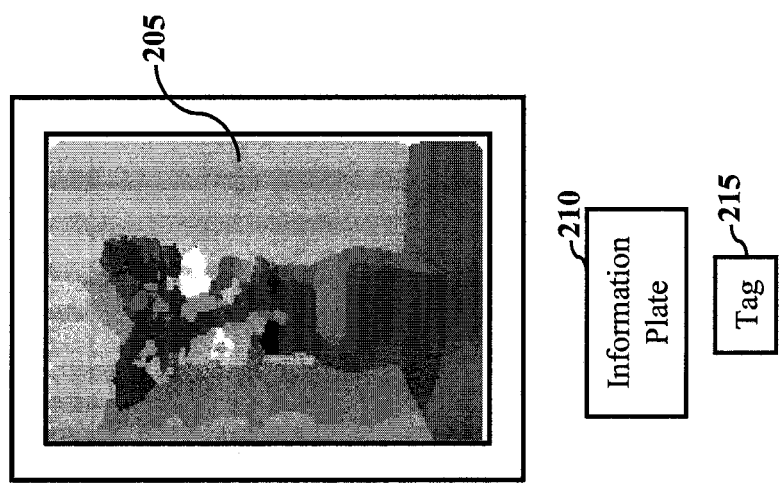
Figure 2C:
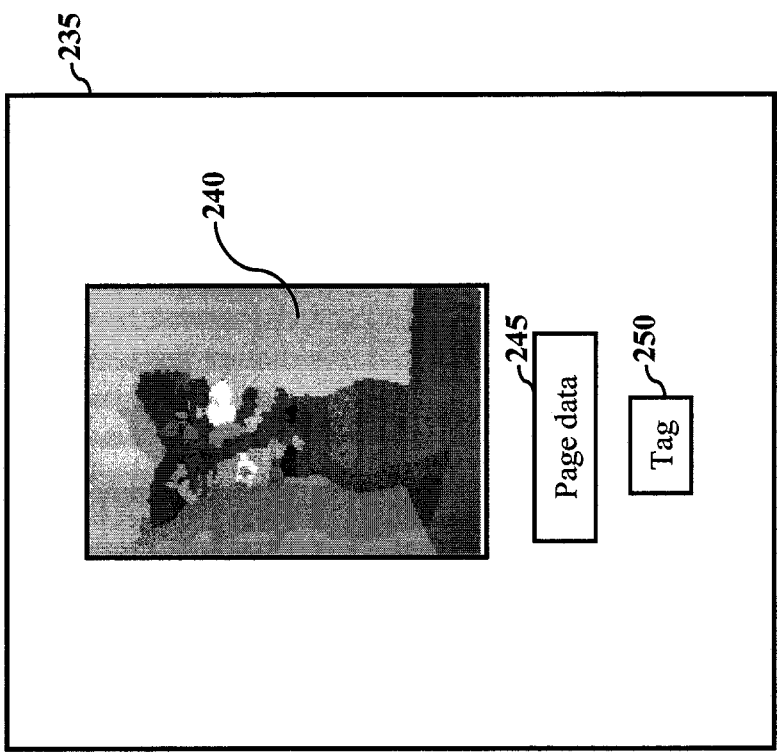

Referring now to FIGS. 2A-2C, applications of a data record according to one or more embodiments of the invention are illustrated. Referring first to FIG. 2A, a creative work 205 is shown as a painting, which may be on display. Information related to the creative work 205 may be printed on an information plate 210. In that fashion, individuals viewing creative work 205 can simultaneously view information about the creative work. According to one embodiment, a data record associated with creative work 205 may be indicated by tag 215. Tag 215 may relate to one of a blue tag (e.g., blue tag 105), purple tag (e.g., purple tag 115) and white tag (e.g., white tag 125). For example, an identification number associated with the data record may be printed on tag 215. Similarly, it may be appreciated that tag 215 may include an optical target, such as a barcode, providing a reference to the data record. In that fashion, an individual viewing creative work 205 can contemporaneously retrieve information associated with the creative work, as will be described in more detail with reference to FIG. 3.

It should also be appreciated that tag 215 may provide a reference to a data communication network address which may provide information for creative work 205. According to another embodiment, tag 215 may provide information stored in a data element as text and/or an image. Further, it may also be appreciated that tag 215 may be attached to, or integrated with, either of creative work 205 or information plate 210.

Referring now to FIG. 2B, a graphical representation of a printed publication 220 is shown including a representation of a creative work 225, according to one embodiment of the invention. Printed publication 220 may be one of a book, magazine, newspaper and any printed publication in general. Printed publication 220 may include a tag 230 to provide information related to creative work 225. Tag 230 relates to another embodiment of tag 215 of FIG. 2A. As such, tag 230 may provide information related to a data record associated with creative work 225. It should also be appreciated that tag 230 may relate to one of a blue tag (e.g., blue tag 105), purple tag (e.g., purple tag 115) and white tag (e.g., white tag 125).

Referring now to FIG. 2C, a representation of a webpage 235 accessible by a data communication network is shown according to one embodiment of the invention. As shown in FIG. 2C, webpage 235 can include a graphical representation of creative work 240, page data 245 and tag 250. Page data 245 may be text and/or images provided by an author of the website and may, or may not, relate to the creative work 240 represented. Tag 250 relates to another embodiment of tag 215 of FIG. 2A. Further, tag 250 may relate to a link to access a data record associated with the representation of the creative work 240. According to another embodiment, tag 250 may be used to indicate that the graphically represented creative work 240 is associated with a data record. Tag 250 may relate to one of a blue tag (e.g., blue tag 105), purple tag (e.g., purple tag 115) and white tag (e.g., white tag 125).

According to another embodiment, when tag 250 relates a white tag (e.g., white tag 125), webpage 235 may relate to an open source reference website. As such, page data 245 may represent data provided by one or more users describing creative work 240. Page data 245 may further be editable by the one or more users. Similarly, information associated with tag 250, configured as a white tag, may be editable by the users. In that fashion, webpage 235 may be accessible as a reference source, providing information for creative work 240.

While tag 250 has been described as relating to a graphical representation of a creative work 240, it should also be appreciated that tag 250 may be used to identify a data record associated with additional types of media. For example, tag 250 may be associated with a data record for one of a digital image, audio data, two-dimensional representation, three-dimensional representation, and media data associated with a creative work in general. As such, a data record associated with tag 250 may be accessible from webpage 235 to retrieve data provided by the data record.

Figure 3:
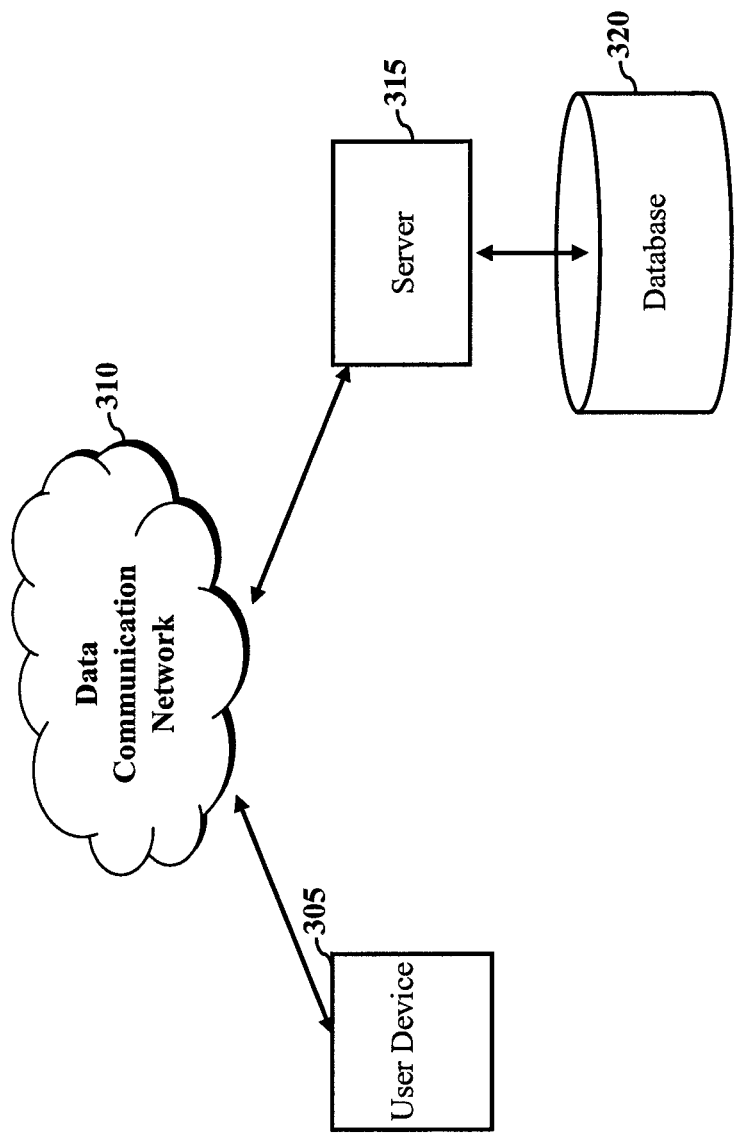
FIG. 3 depicts a system according to one or more embodiments of the invention.

Referring now to FIG. 3, a simplified system diagram is shown according to one or more embodiments of the invention. As shown in FIG. 3, a user device 305 and server 315 are in communication over a data communication network 310. Additionally, server 315 is coupled to database 320. In one embodiment, user device 305 may relate to one or more of a personal computer, mobile communication device and data communication device in general. The user, device 305 may be configured to request data records for a creative work over data communication network 310, as will be described below in more detail with reference to FIGS. 4A-4B. Data communication network 310 can relate to one of a local area network (LAN), wide area network (WAN), packet switched network, mobile communication network, the internet and any data communication network in general. As such, user device 305 may be configured to communicate with server 315 over data communication network 310.

Server 315 is configured to receive requests for, and issue, a data record for a creative work. Issuing data records by server 315 is described below in more detail with reference to FIGS. 4A-4B. Data records and associated data may be stored and accessible using database 320. According to another embodiment, tag data related to one of a blue tag (e.g., blue tag 105), purple tag (e.g., purple tag 115) and white tag (e.g., white tag 125) may be stored in database 320. In yet another embodiment, server 315 may be configured to restrict access to data records based, at least in part, on user identification and the type of data record. Data records stored in database 320 may require verification by server 315 of a user login and password. Further, verified user identities may be restricted to particular data records. For example, access to an unlocked blue tag (e.g. blue tag 105) may be restricted to the author credited with the creative work. For a white tag (e.g., white tag 125), access to modify data associated with the white tag may not require user verification according to another embodiment. Alternatively, access to modify data associated with the white tag may require at least one of a fee and registration. According to another embodiment, user verification may be required to create a new white tag.

Figures 4A, 4B:
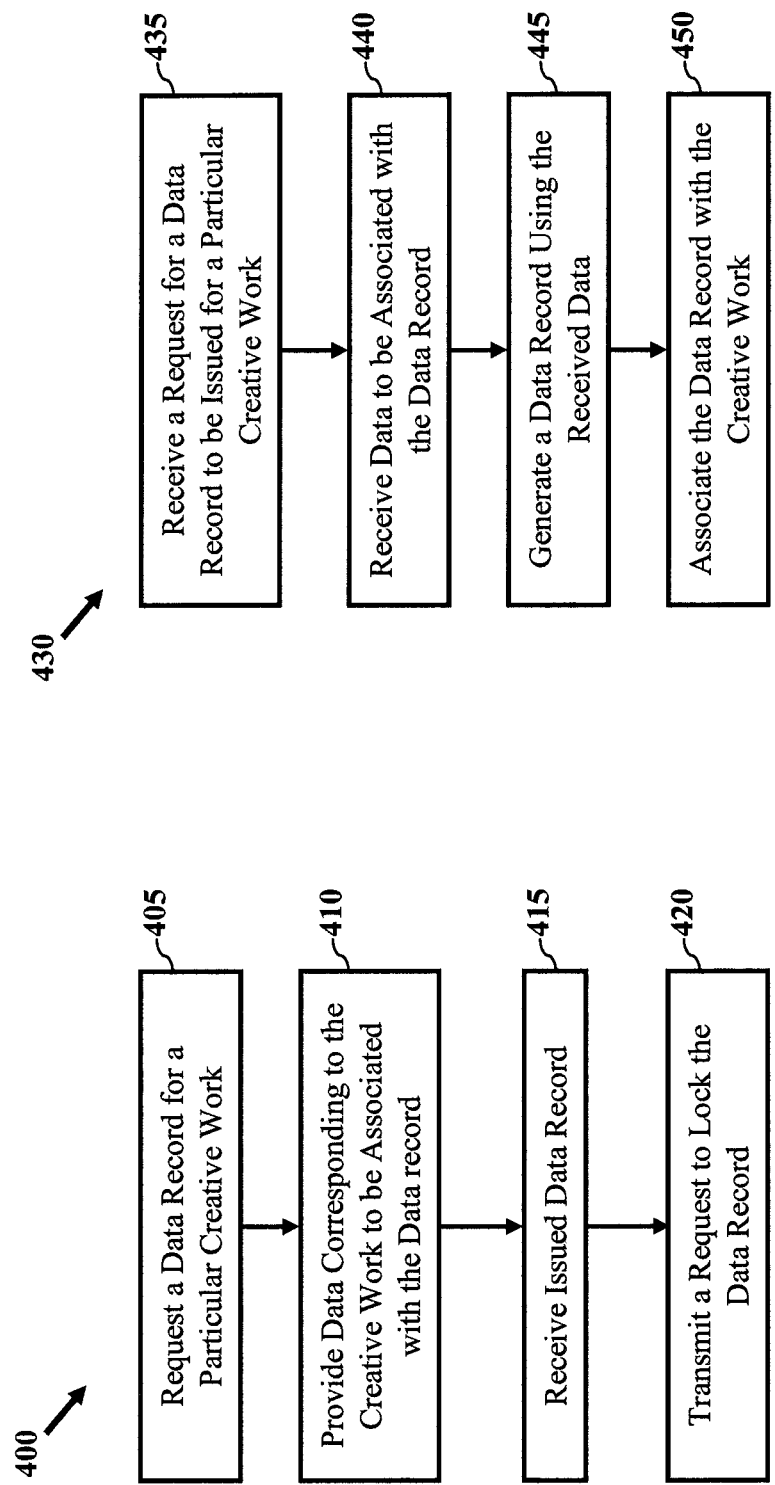
FIGS. 4A-4B depict processes according to one or more embodiments of the invention.

Referring now to FIGS. 4A-4B, processes are shown according to one or more embodiments of the invention. Referring first to FIG. 4A, process 400 is shown for requesting a data record for a particular creative work. Process 400 may be initiated by requesting a data record for a particular creative work at block 405 by, for example, a user device (e.g., user device 305). The request may indicate the type of data record to be issued. For example, the request can indicate one of a blue tag (e.g., blue tag 105), purple tag (e.g., purple tag 115) and white tag (e.g., white tag 125). Data corresponding to the creative work may be transmitted to a server (e.g., server 315) at block 410 to be associated with a data record. Process 400 can include receiving a data record issued by the server at block 415. Data records may be issued electronically to user devices. According to another embodiment, the user device may be configured to transmit a request to lock the data record at block 420. In that fashion, the server can generate an unalterable data record. According to another embodiment, only the author verified as the creator of the creative work may be allowed to lock the tag.

Referring now to FIG. 4B, process 430 is shown for generating a data record according to one embodiment of the invention. Process 430 may be initiated by receiving a request for a data record to be issued for a particular creative work, at block 435, by a server (e.g., server 315). The request can indicate one of a blue tag (e.g., blue tag 105), purple tag (e.g., purple tag 115) and white tag (e.g., white tag 125). The server can receive data to be associated with the data record at block 440 and generate a data record using the received data. The data record can relate to one of a blue tag (e.g., blue tag 105), purple tag (e.g., purple tag 115) and white tag (e.g., white tag 125). At block 450, the data record can be associated with the creative work. For example, the creative work may be labeled with a tag corresponding to the data record. The data record and received data may also be stored in a database (e.g., database 320).

Figure 5:
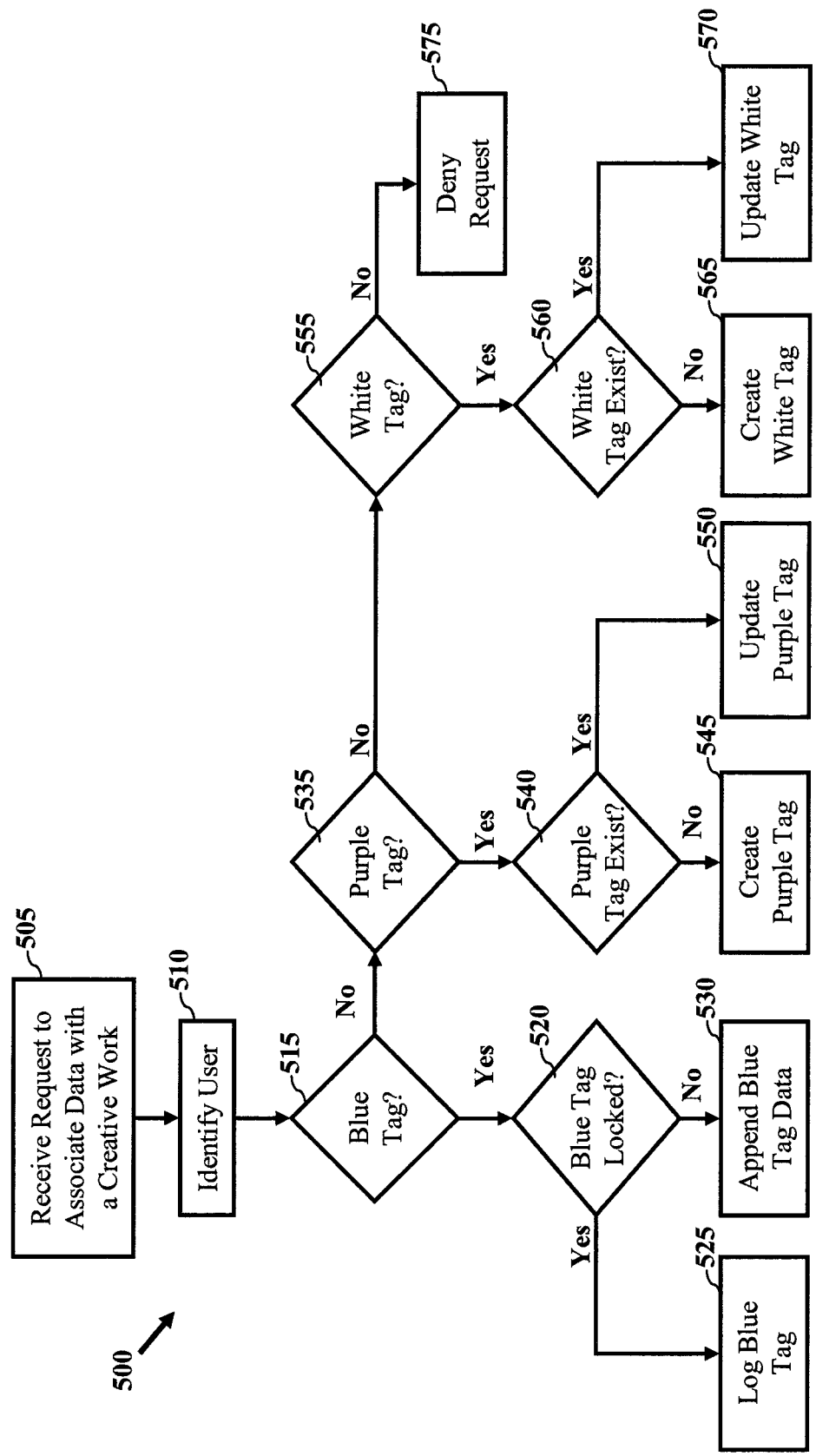
FIG. 5 depicts a graphical representation of a process for creating records according to one embodiment of the invention.

FIG. 5 depicts process 500 for generating a data record according to one or more embodiments of the invention. Process 500 may be initiated at block 505 when a request is received for a data record to be issued. The request can be received by a server (e.g., server 315) which identifies a user at block 510. Identification of a user at block 510 may be based on a user login and password. Process 500 determines if the request is for a blue tag (e.g., blue tag 105), purple tag (e.g., purple tag 115) or white tag (e.g., white tag 125) at block 515, block 535 and block 555, respectively. When a blue tag request is accepted ("Yes" path out of decision block 515), the server can receive data from the identified user to be associated with the data record. According to one embodiment, data received from an author associated with the data record can be added to the data record until the blue tag is locked by the author. When the blue tag is locked ("Yes" path out of decision block 520), received data is appended to a log file associated with the blue tag at block 525. When the blue tag is not locked ("No" path out of decision block 520), the received data can be added to the data record at block 530.

When a purple tag request is accepted ("Yes" path out of decision block 535), the server determines whether a purple tag request is authorized at block 540. Authorization of the purple tag request may be based on user identification, and/or if a purple tag already exists. When the purple tag is authorized and a purple tag has not been created ("No" path out of decision block 540), a purple tag may be created at block 545. When a purple tag exists for a creative work ("Yes" path out of decision block 540), data associated with the purple tag may be updated at block 550.

Continuing to refer to FIG. 5, when a white tag request is accepted ("Yes" path out of decision block 555), the server determines whether a white tag request has been created at block 560. When a white tag does not exist for a creative work ("No" path out of decision block 560), a white tag may be created at block 565 based on the received data. When a white tag exists for a creative work ("Yes" path out of decision block 560), data associated with the white tag may be updated at block 570. Unauthorized requests ("No" path out of decision blocks 515, 535 or 560) are denied at block 575.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. An apparatus for providing a permanent provenance data record for a creative work, comprising:
   a memory;
   a processor in communication with the memory, and configured to issue a plurality of processing instructions stored in the memory, wherein the processor issues instructions to:
   receive, by a server, an issuance request from a user device of an author credited with creating the creative work, the user device communicatively coupled to the server through a network, for an unlocked provenance data record to be issued for the creative work, wherein said creative work is a visual object of fine art;
   verify, by the server, the identity of the author making the issuance request to confirm that the author is authorized to request the issuance of the provenance data record type specified in the issuance request;
   issue, by the server, an unlocked provenance data record using data provided by the author in the issuance request;
   store the issued unlocked provenance data record in a database, configured to store provenance data records associated with creative works, coupled to the server;
   receive, by the server, a lock request from the user device of the author to lock the issued unlocked provenance data record;
   lock, by the server, the issued unlocked provenance data record to generate a permanent provenance data record, such that data provided by the author and stored in the permanent provenance data record is unalterable, the permanent provenance data record configured to facilitate appending additional data to the permanent provenance data record; and
   label the creative work with a tag providing a reference to the permanent provenance data record, wherein provenance data record is a record of ownership of a work of art or an antique.

2. The apparatus of claim 1, wherein the type of provenance data record is a provenance data record associated with one of a user having rights to the creative work and a general user.

3. The apparatus of claim 1, wherein the server is further configured to receive a unique identification number, from the user device over the network, usable to access the permanent provenance data record.

4. The apparatus of claim 1, wherein the received data relates to one or more of a description, image, title, author name, date, log information current owner name and any type of data describing the creative work in general.

5. The apparatus of claim 1, wherein the server is further configured to issue the provenance data record in an electronic form to the user device over the network.

* * * * *